United States Patent [11] 3,603,724

[72] Inventor Renville H. McMann, Jr.
New Canaan, Conn.
[21] Appl. No. 836,756
[22] Filed June 26, 1969
[45] Patented Sept. 7, 1971
[73] Assignee Columbia Broadcasting System, Inc.
New York, N.Y.

[54] COLOR TELEVISION CONVERSION APPARATUS
8 Claims, 1 Drawing Fig.

[52] U.S. Cl. .......... 178/5.4 C, 178/5.2 R
[51] Int. Cl. .......... H04n 5/02
[50] Field of Search .......... 178/5.4 C, 6.8 CR, 5.2

[56] References Cited

UNITED STATES PATENTS

| | | | |
|---|---|---|---|
| 2,868,870 | 1/1959 | Goldmark .......... | 178/6.8 |
| 3,033,921 | 5/1962 | Van De Polder .......... | 178/5.4 |
| 3,384,706 | 5/1968 | Davidse .......... | 178/5.4 |
| 3,475,549 | 10/1969 | Goldmark et al. .......... | 178/5.2 |

*Primary Examiner*—Richard Murray
*Assistant Examiner*—P. M. Pecori
*Attorney*—Brumbaugh, Graves, Donohue & Raymond

ABSTRACT: As described herein, PAL Color television signals having a fixed frame frequency are supplied to a color decoder network which recovers and supplies as separate outputs luminance and chrominance representative signals. A pair of balanced modulators are provided for modulating a high frequency color carrier signal in accordance with the chrominance signals and a mixer circuit combines the modulation sidebands of the color carrier signal with a pilot signal having a frequency which bears a fixed relation to the color carrier frequency. The luminance signals and combined modulation sidebands and pilot signal are then supplied to a pair of cathode-ray tubes and the displays are scanned by a pair of cooperating cameras operating at a predetermined frame frequency. The luminance and chrominance signals reproduced by the cameras are then supplied to a video converter network wherein the pilot signal is utilized to extract the modulation from the modulated carrier sidebands to provide color difference signals and the color difference signals are combined with the luminance signals to produce standard NTSC luminance and chrominance signals.

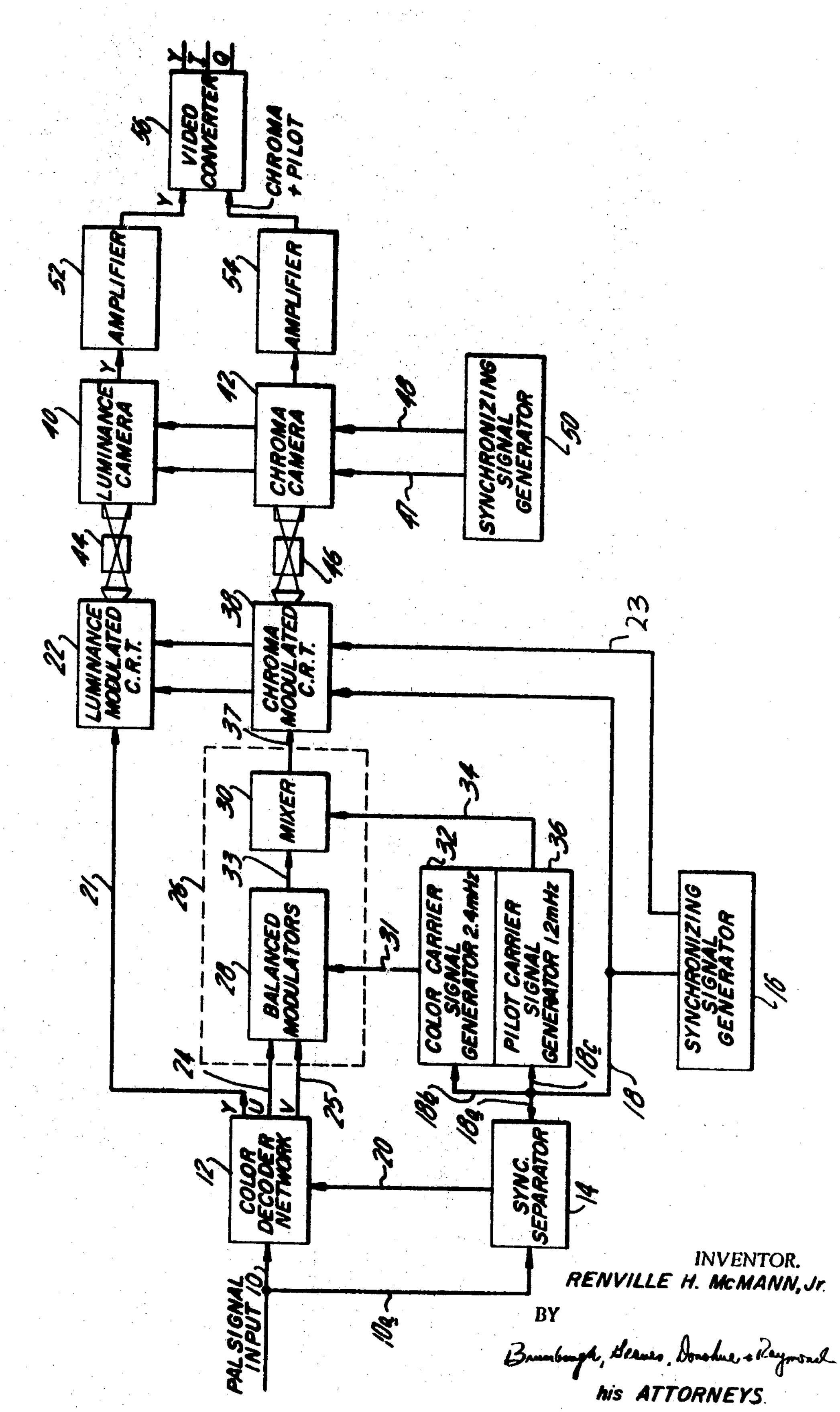
INVENTOR.
RENVILLE H. McMANN, Jr.
BY
Brumbaugh, Graves, Donohue & Raymond
his ATTORNEYS

COLOR TELEVISION CONVERSION APPARATUS

BACKGROUND OF THE INVENTION

This invention relates to color television systems and, more particularly, to a new and improved conversion arrangement which converts PAL, SECAM III and the like luminance and chrominance signals into standard NTSC luminance and chrominance signals.

In the Mar. 1967 issue of the IEEE - Spectrum (Pages 104–111), an article entitled "International standards for color television" discusses the renewed but unsuccessful attempts to adopt an international standard for color television. According to the article, among the many different color television systems, the three most predominantly proposed systems are the NTSC system, which is well understood and need not be described herein, the PAL system and the SECAM III system.

Both the PAL and the SECAM III arrangements involve the use of a color subcarrier to carry the chrominance information. In the SECAM III scheme, color difference signals R–Y and B–Y modulate a sub-carrier in alternate lines and a delay line in the receiver makes the color difference signals simultaneously available to a decoding matrix. In the PAL system, the U and V components of the chrominance information modulate the subcarrier, and the V component is reversed along its axis at each new line. In both systems, the value of 4.43 megaHertz has been selected for the color subcarrier.

In stating that a universal color television system be adopted, the article suggests that there exists a strong possibility that either the PAL or the SECAM III system will be selected ultimately in preference over the NTSC system for use in Europe and elsewhere. To support its conclusion that a universal color television system be adopted, the article points out that the exchange of programs with different standards is a complex operation and often results in a deterioration in picture quality. In all cases, when the monochrome standards differ, for example, between a country with a 525 line system and one with a 625 line system, the exchange of color program material requires delicate transcoding. The fact that both countries have the same color standard differing in frame frequency, both NTSC, for example, hardly simplifies the transcoding operation.

SUMMARY OF THE INVENTION

Accordingly, it is an object of the present invention to provide apparatus which will convert signals from one standard to another without any appreciable deterioration in picture quality.

It is another object of the present invention to provide apparatus for converting signals developed by one system into signals for use in another system having the same color standard but having a different frame frequency.

It is another object of the present invention to provide apparatus for converting signals developed by one system into signals for use in another system having a different color standard and a different frame frequency.

These and other objects of the present invention are accomplished by modulating a high frequency color carrier signal in accordance with the chrominance information contained in a color television signal having a fixed frame frequency, combining the modulation sidebands of the carrier signal with a pilot signal having a frequency which bears a fixed relation to the color carrier signal and reproducing images corresponding to the luminance information in the color television signal and to the combined modulation sidebands and pilot signal. At least one scanning device operating at the desired frame frequency responds to the reproduced images to develop luminance and chrominance signals. The reproduced pilot signal included in the chrominance signals is thereafter utilized to extract the modulated carrier sidebands in the chrominance signals to provide color signals and the color signals are combined with the developed luminance signal to produce luminance and chrominance signals having the desired frame frequency.

In one embodiment of the invention, signals having a fixed color standard and a fixed frame frequency are supplied to a color decoder network which recovers and supplies as separate outputs luminance and chrominance representative signals. A pair of balanced modulators are provided for modulating a high frequency color carrier signal in accordance with the chrominance signals and a mixer circuit is provided for combing the modulation sidebands of the carrier with a pilot signal having a frequency which bears a fixed relation to the color carrier frequency. A pair of cathode ray tubes reproduce images of the luminance information and the combined modulation sidebands and the pilot signal, respectively. The faces of the two cathode ray tubes are scanned by a pair of cameras operating at the desired frame frequency and the luminance and combined modulation sidebands and pilot signals reproduced by the cameras are supplied to a video converter network. In the video converter network, the modulation from the modulation carrier sidebands is extracted to provide color difference signals and the color difference signals are combined with the luminance signal to produce luminance and chrominance signals having the desired frame frequency.

BRIEF DESCRIPTION OF THE DRAWINGS

In the Drawing:

The single FIGURE schematic block diagram illustrating the arrangement of one embodiment of a color television conversion apparatus arranged according to the present invention.

DESCRIPTION OF THE PREFERRED EMBODIMENT

In a representative color television conversion network arranged according to the present invention, as shown in the drawing, encoded PAL color television signals having a frame frequency of 25frames (50 fields) per second and a subcarrier frequency of 4.43mHz. are supplied to a color decoder network 12 and a sync separator circuit 14 via a conductor 10 and its branch conductor **10*a*, respectively. A synchronizing signal generator 16, which may be of conventional construction and, accordingly, need not be described herein, supplies horizontal drive signals having a frequency of, for example, 15,625Hz. to the enabling input terminal of the sync separator 14 via a conductor 18 and its branch conductor 18*a*. The sync separator circuit 14 is enabled by the horizontal drive signals and transmits the 4.43 mHz color synchronizing signals of the PAL color television signals through a conductor 20 to the color decoder network 12**.

In response to the separated color synchronizing signals, the color decoder network 12, which also may be of conventional construction, recovers from the modulated subcarrier signal the same U(0.493 B–Y) and V (0.877 R–Y) chrominance information originally used to produce the modulated wave. The network 12 may also include a monochrome video amplifier and, accordingly, recovers the luminance information from the color television signals. The luminance signals Y developed by the color decoder network 12 are supplied directly along a conductor 21 to the beam intensity control electrode of a conventional cathode ray tube 22 which also receives blanking and horizontal and vertical deflection signals from the synchronizing signal generator 16 over the conductor 18 and a second conductor 23. The generator 16 supplies the vertical deflection signals at a vertical frame rate of 25frames (50fields) per second and the horizontal deflection signals at a line rate of 15,625lines per second. Although not shown, it will be understood that the luminance signals Y may be first transmitted through vertical and horizontal aperture correction circuits prior to their being supplied to the cathode ray tube 22.

From the network 12 the U and V signals are supplied over a pair of conductors 24 and 25 to an encoder circuit 26 which includes a pair of balanced modulators 28 and a mixer circuit 30. The modulators 28 receive as second input signals over a conductor 31 color carrier signals from a signal generator 32. The color carrier signals supplied to the modulators 28 by the generator 32 preferably have a frequency of 2.4mHz. To synchronize the operation of the color carrier signal generator 32 with the synchronizing signal generator 16, the horizontal drive signals developed by the generator 16 are supplied to the generator 32 over a second branch conductor **18*b* of the conductor 18**.

The outputs of the modulators 28 are combined in the known manner so that only the modulation sidebands appear at the output, the carrier amplitude being zero when the modulation input is zero. From the modulators 28, the modulation sidebands of the color carrier signal are supplied over a conductor 33 to the mixer circuit 30 which receives as a second input over a conductor 34 a pilot carrier signal from a pilot carrier signal generator 36. A suitable frequency for the pilot signal is 1.2mHz. which is one-half the frequency of the color carrier signal. Again, to synchronize the operation of the pilot carrier signal generator 36 and the synchronizing signal generator 16, enabling horizontal drive signals are supplied from the generator 16 to the generator 36 over a third branch conductor **18*c* of the conductor 18**.

The sum of the modulation sidebands and the pilot carrier signal are supplied from the mixer circuit 30 of the encoder network 26 over a conductor 37 to the beam intensity control electrode of a second conventional cathode ray tube 38. The cathode ray tube 38 operates in synchronism with the cathode ray tube 22 and, to this end, receives from the synchronizing signal generator 16 the blanking and horizontal and vertical deflection signals over the conductors 18 and 23.

As described in the pending patent application entitled "-Color Film Recording and Reproducing Apparatus", Ser. No. 519,106now abandoned and a continuation filed, Ser. No. 862,564and assigned to the assignee of the instant invention, in an arrangement of the above-described type, the light outputs from the cathode ray tubes 22 and 38 may be utilized to record the luminance and color information in the decoded PAL signals on a monochrome record. Specifically, if an ultrafine grain monochrome film were placed in the path of the light from the cathode ray tubes 22 and 38, the beam deflection in the tubes and lens system therefore could be arranged to record the luminance information reproduced by the cathode ray tube 22 on one portion of each frame of the record and to record the chrominance information reproduced on the face of the cathode ray tube 38 as a succession of parallel lines in the remaining portion of each frame of the record. Each line would comprise a record of the modulation sidebands of the suppressed 2.4mHz. color carrier signal modulated as a function of the color information in the originally developed PAL signal (U and V) and a record of the 1.2mHz pilot signal.

According to the present invention, however, cooperating with the luminance and chrominance cathode ray tubes 22 and 38, respectively, are a pair of television cameras 40 and 42, respectively, together with a pair of suitable optical systems, 44 and 46, respectively. The cameras 40 and 42 are operated under standard NTSC television broadcasting conditions, namely at a horizontal line rate of 15,750 lines per second and a vertical frame rate of 30frames (60 fields) per second. To this end, the cameras 40 and 42 are supplied with suitable horizontal and vertical deflection and blanking signals over a pair of conductors 47 and 48 from a synchronizing signal generator 50. In this manner, the luminance and chrominance information in the PAL signals are converted to a 525line, 60field per second standard.

The brightness picture signal output from the television camera 40 and the chrominance information carrying signals, including the color carrier modulation sidebands and the pilot signal, from the television camera 42 are supplied through a pair of amplifiers 52 and 54, respectively, to a video converter network 56. In the video converter network 56, which may be of the type disclosed in the above-mentioned patent application entitled "Color Film Recording and Reproducing Apparatus", Ser. No. 519,106, now abandoned and a continuation filed, Ser. No. 862,564and accordingly, need not be described herein, the pilot signal in the chrominance carrying signal is utilized to drive synchronous detectors which serve to extract the modulation from the modulated carrier sidebands to provide color difference signals R–Y, G–Y and B–Y. The separated difference signals are then combined with the luminance signal Y to produce standard NTSC luminance and chrominance signals Y, I and Q.

In operation, encoded PAL color television signals are supplied to the color decoder network 12 which detects and supplies as separate outputs luminance representative signals Y and the chrominance representative signals U and V. The luminance signals Y are supplied directly to the beam intensity control electrode of the cathode ray tube 22 while the chrominance signals U and V are modulated in the modulators 28 onto a 2.4mHz. carrier signal developed by the color carrier signal generator 32. The outputs from the modulators 28 are combined so that only the modulation sidebands appear at the output and thereafter the modulation sidebands are mixed in the circuit 30 with a 1.2 mHz pilot signal generated by the generator 36. The sum of the modulation sidebands and the pilot carrier signal are then supplied from the mixer circuit 30 to the beam intensity control electrode of the conventional cathode ray tube 38. Both cathode ray tubes 22 and 38 are driven at a vertical frame rate of 25frames per second and a line rate of 15,625frames per second and a line rate of 15,625lines per second. The luminance information reproduced on the face of the cathode ray tube 22 and the chrominance information reproduced as a succession of parallel lines on the face of the cathode ray tube 38 are scanned by the pair of television cameras 40 and 42 operating at frame frequencies of 30frames per second and at line scanning frequencies of 15,750lines per second. The luminance signals Y and the chrominance signals, including the color carrier modulation sidebands and the pilot signal, developed by the cameras 40 and 42 are supplied through the amplifiers 52 and 54, respectively, to the video converter network 56. In the network 56, the pilot signal drives synchronous detectors which serve to extract the modulation from the modulation carrier sidebands to provide color difference signals and the color difference signals are combined with the luminance signals to produce standard NTSC luminance and chrominance signals Y, I and Q.

Although the invention has been described herein with reference to a specific embodiment, many modifications and variations therein will readily occur to those skilled in the art. For example, according to the teachings of my copending patent application entitled "Field Sequential Color Scan Converter" Ser. No. 600,857, now U.S. Pat. NO. 3,475,548and assigned to the assignee of the present invention, a single cathode-ray tube may be utilized to reproduce on the face thereof the luminance and chrominance plus carrier information in the decoded PAL color television signals. In this arrangement, a singular scanning device operating at conventional NTSC scanning frequencies could be utilized to convert the different standard color television signals to standard NTSC color television signals. Accordingly, all such modifications and variations are included within the intended scope of the invention as defined by the following claims.

I claim:

1. Apparatus for converting color television signals from one standard system to a different standard system comprising modulator means responsive to the chrominance information contained in color television signals having a selected frame frequency for modulating a high frequency carrier in accordance with said chrominance information, combining means for combining the modulation sidebands of the carrier signal with pilot signals having a frequency bearing a fixed relation to the color carrier frequency, image-reproducing means operating at the selected frame frequency for reproducing separate images corresponding to the luminance information contained in the color television signals and to the combined modulation sidebands and pilot signals, cooperating image scanning means operating at a different frame frequency and responsive to the images reproduced by the image reproducing means for developing luminance signals and chrominance carrying signals, including a first signal component representing the modulation sidebands and a second signal component representing the pilot signal, and output means responsive to the luminance signals and to the chrominance carrying signals for providing as separate outputs luminance and chrominance color television signals having the different frame frequency.

2. Apparatus according to claim 1 wherein the output means comprises means responsive to the second signal component of the developed chrominance carrying signals for extracting the modulation from the first signal component to produce color representative signals and means for combining the color representative signals and the luminance signals to produce luminance and chrominance signals.

3. Apparatus according to claim 1 wherein the image-reproducing means comprises at least two image reproducing devices responsive to the luminance information contained in the color television signals and to the combined modulation sidebands and pilot signal, respectively.

4. Apparatus according to claim 3 wherein the image-scanning means comprises at least two image-scanning devices cooperating with said image reproducing devices for developing the luminance signals and the chrominance carrying signals, respectively.

5. Apparatus according to claim 3 wherein the reproduced images corresponding to the combined modulation sidebands and pilot signal comprises a succession of closely adjacent substantially parallel lines, each line comprising a record of the modulation sidebands of the carrier signal.

6. Apparatus according to claim 5 wherein each line comprises a record of the modulation sidebands of the carrier signal and the pilot signal of different frequency in superposition.

7. Apparatus according to claim 1 further comprising input means responsive to encoded color television signals having a selected frame frequency and a selected color standard for recovering therefrom and supplying as separate outputs luminance representative and chrominance representative signals.

8. Apparatus according to claim 7 further comprising means for synchronizing the recovery of the luminance and chrominance representative signals with the modulation of the high frequency carrier signal by said chrominance representative signals and with the reproduction of the images by the image-reproducing means.